United States Patent
Kondo et al.

(10) Patent No.: US 7,251,109 B2
(45) Date of Patent: Jul. 31, 2007

(54) MAGNETORESISTIVE HEAD

(75) Inventors: Reiko Kondo, Kawasaki (JP); Yutaka Shimizu, Kawasaki (JP); Atsushi Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 388 days.

(21) Appl. No.: 10/974,640

(22) Filed: Oct. 27, 2004

(65) Prior Publication Data

US 2005/0280952 A1    Dec. 22, 2005

(30) Foreign Application Priority Data

Jun. 16, 2004   (JP) .............................. 2004-178407

(51) Int. Cl.
*G11B 5/39* (2006.01)

(52) U.S. Cl. ..................................................... 360/322

(58) Field of Classification Search ................ 360/322, 360/324.12, 324.2
See application file for complete search history.

(56) References Cited

U.S. PATENT DOCUMENTS 5,555,142 A * 9/1996 Komai et al. ............. 360/77.06
5,557,491 A * 9/1996 Gill et al. ................. 360/327.24
6,714,389 B1 * 3/2004 Pokhil et al. ........... 360/324.12
2002/0039265 A1   4/2002 Yuasa et al. ................. 360/322

FOREIGN PATENT DOCUMENTS

JP     2000-276714        10/2000
JP     2002-1577714 A  *  5/2002

* cited by examiner

*Primary Examiner*—Julie Anne Watko
(74) *Attorney, Agent, or Firm*—Greer, Burns & Crain, Ltd.

(57) ABSTRACT

A magnetoresistive head includes a first magnetic shield, a first electrode terminal arranged on the first magnetic shield at an entry side of a magnetic field from a carrier, a third electrode terminal that is spaced from the first electrode terminal, and arranged on the first magnetic shield at a side opposite to the entry side of the magnetic field from the carrier, a magnetoresistive coating arranged on the first and third electrode terminals, a second electrode terminal that is arranged on the magnetoresistive coating, and opposed to the first electrode terminal, a second magnetic shield arranged on the second electrode terminal, and a sense current source connected to the first and second electrode terminals, which applies sense current in a direction perpendicular to a coating surface of the magnetoresistive coating.

18 Claims, 12 Drawing Sheets

FIRST EMBODIMENT

PRINCIPLE VIEW OF
MAGNETORESISTANCE HEAD

FIRST EMBODIMENT

FIG. 3

MANUFACTURE PROCESS OF FIRST EMBODIMENT

MANUFACTURE PROCESS OF FIRST EMBODIMENT

MANUFACTURE PROCESS OF FIRST EMBODIMENT

SECOND EMBODIMENT

FIG. 7

MANUFACTURE PROCESS OF SECOND EMBODIMENT

MANUFACTURE PROCESS OF SECOND EMBODIMENT

MANUFACTURE PROCESS OF THIRD EMBODIMENT

MANUFACTURE PROCESS OF THIRD EMBODIMENT

MAGNETORESISTIVE HEAD

This application claims the right of priority under 35 U.S.C. §119 based on Japanese Patent Application No. 2004-178407, filed on Jun. 16, 2004, which is hereby incorporated by reference herein in its entirety as if fully set forth herein.

BACKGROUND OF THE INVENTION

The present invention relates generally to magnetoresistive heads used for magnetic storage, such as a magnetic disc drive and a magnetic tape.

Along with recent smaller and higher density productions of magnetic disc drives decrease a floating amount of a head slider, and demand contact recording/reproducing that has an extremely low floating height or requires a slider to contact a record carrier.

A conventional magnetic inductive head deteriorates reproduction output as the circumferential speed, which is a relative speed between a head and a medium, decreases in a small magnetic disc. Magnetoresistive ("MR") heads, which provide a reproduction output that does not depend upon the circumferential speed and therefore maintain a large output even for the low circumferential speed, are vigorously developed and used mainly for magnetic heads. More recently, magnetic heads that utilize a Giant Magnetoresistive ("GMR") effect come into the market.

The high-recording density of a magnetic disc drive reduces a recording area per bit, and weakens a generated magnetic field. Therefore, MR sensors and heads are demanded which can be applied to a finer magnetic field range and detect changes of a weak external magnetic field.

At present, spin-valve MR sensors that utilize a spin-valve GMR effect have been frequently used for magnetic heads. The spin-valve MR sensors vary a magnetization direction of a free ferromagnetic layer (or a free layer) according to a signal magnetic field from a record carrier, and changes of a relative angle to a magnetization direction of a pinned ferromagnetic layer (or a pinned layer) vary the resistance of the MR sensor.

A general design that attempts to apply this MR sensor to a magnetic head fixes the magnetization direction of the pinned layer onto a height direction of the MR device, and directs, in a device width direction orthogonal to the pinned layer, the magnetization direction of the free layer when no external magnetic field is applied.

This configuration can linearly increase and decrease the resistance of MR sensor according to whether the signal magnetic field direction from the magnetic record carrier is parallel to or antiparallel to the magnetization direction of the pinned layer. Such a linear resistance variance facilitates signal processing of the magnetic disc drive.

The conventional MR sensor applies the sense current parallel to a coating surface, and reads resistance changes that rely on the external magnetic field. This Current in Plane ("CIP") configuration that applies the current parallel to GMR coating surface lowers an output as the sensing area that is defined by a pair of electrodes reduces. The CIP spin-valve MR sensor needs an insulating coating between the GMR coating and upper/lower magnetic shields.

In other words, a distance between the magnetic shields is equal to a sum of GMR coating thickness and insulating coating thickness times 2. Since the current insulating coating thickness has a lower limit of about 20 nm, a distance between the magnetic shields is equal to a sum of the GMR coating thickness and about 40 nm.

As the recording bit becomes shorter on the record carrier, the current CIP spin-valve MR sensors cannot meet a demand for the distance between the magnetic shields of 40 nm or smaller.

Proposed post spin-valve GMRs as one solution for this problem are a Current Perpendicular to Plane ("CPP")-GMR configuration that applies the current perpendicular to the GMR coating surface, and a tunnel MR ("TMR").

TMR is a configuration that holds a thin insulating layer between two ferromagnetic layers, and varies the tunnel current amount that flows through the insulating layer according to the magnetization directions of the two ferromagnetic layers. TMR exhibits such large resistance variance and good sensitivity that it is one of promising post spin-valve GMRs.

CPP-GMR characteristically provides a large output as the sectional area of a portion reduces, through which the sense current of the GMR coating flows. This feature is a great advantage over CIP-GMR.

Since the current flows from one ferromagnetic layer to the other ferromagnetic layer across the insulating layer in TMR, TMR can be regarded as a kind of CPP structure and has the above advantage.

Since the high-recording density of a magnetic disc drive promotes fine processing of a MR coating and results in reading of adjacent tracks during reproducing, a known structure provides a pair of magnetic shields at both sides of the MR coating in the track width direction. The MR head that utilizes the MR coating disadvantageously generates Barkhausen noises and greatly fluctuates reproduction outputs when the MR coating does not have a single magnetization.

Therefore, a magnetization control coating is provided to control the magnetization of the MR coating. A pair of magnetization control coatings are provided at both sides of the MR coating in the track width direction, and each include a high coercive force coating, typically made of CoPt, etc., or a layered coating that has an antiferromagnetic coating and a ferromagnetic coating, typically made of PdPtMn, etc. An alternative structure of the magnetization control coating layers an antiferromagnetic coating on a MR coating so as to form the magnetization control coating.

However, the magnetization control using the antiferromagnetic layer layered on the MR coating needs to make orthogonal to each other the pinning directions between the antiferromagnetic coating used for the MR coating and the antiferromagnetic coating used for the magnetization control, and is problematic in that the coating development is difficult. In addition, since the antiferromagnetic coating is layered on the MR coating, it is difficult to reduce a distance between the magnetic shields.

Moreover, when the magnetization control coatings, such as a high coercive force coating, are provided at both sides of the MR coating in the track width direction, the magnetization control coating should be located close to the MR coating. Therefore, it is very difficult to stably manufacture the magnetization control coating with good yield and to stably obtain the effect.

When the magnetic shields are provided at both sides of the MR coating in the track width direction for the high recording density, the magnetization control coatings cannot be provided at both sides of the MR coating in the track width direction.

BRIEF SUMMARY OF THE INVENTION

Accordingly, it is an object of the present invention to provide a MR head that can restrain generations of Barkhausen noises and obtain high reproduction output.

A magnetoresistive head according to one aspect of the present invention includes a first magnetic shield, a first electrode terminal arranged on the first magnetic shield at an entry side of a magnetic field from a carrier, a third electrode terminal that is spaced from the first electrode terminal, and arranged on the first magnetic shield at a side opposite to the entry side of the magnetic field from the carrier, a magnetoresistive coating arranged on the first and third electrode terminals, a second electrode terminal that is arranged on the magnetoresistive coating, and opposed to the first electrode terminal, a second magnetic shield arranged on the second electrode terminal, a sense current source connected to the first and second electrode terminals, the sense current source applying sense current in a direction perpendicular to a coating surface of the magnetoresistive coating, and a bias current source that is connected to and applies bias current to the third electrode terminal and one of the first and second electrode terminals.

Preferably, the sense current and the bias current flow in the same direction along an in-plane perpendicular direction of one of the first and second electrode terminals. The third electrode terminal is electrically isolated from the first and second electrode terminals, and electrically connected to the magnetoresistive coating.

Preferably, the magnetoresistive coating is longer in a device height direction than the first and second electrode terminals. Preferably, the magnetoresistive head further includes a pair of side magnetic shields arranged at both sides of the magnetoresistive coating.

A magnetoresistive head according to another aspect of the present invention includes a first magnetic shield, a first electrode terminal arranged on the first magnetic shield at an entry side of a magnetic field from a carrier, a third electrode terminal that is spaced from the first electrode terminal, and arranged on the first magnetic shield at a side opposite to the entry side of the magnetic field from the carrier, a magnetoresistive coating arranged on the first electrode terminal, a second electrode terminal that is arranged on the magnetoresistive coating, and opposed to the first electrode terminal, a second magnetic shield arranged on the second electrode terminal, a sense current source connected to the first and second electrode terminals, the sense current source applying sense current in a direction perpendicular to a coating surface of the magnetoresistive coating, and a bias current source that is connected to and applies bias current to the third electrode terminal and one of the first and second electrode terminals.

A magnetoresistive head according to still another aspect of the present invention includes a first electrode terminal that is arranged on a first magnetic shield at an entry side of a magnetic field from a carrier, and serves as the first magnetic shield, a third electrode terminal that is spaced from the first electrode terminal, and arranged on the first magnetic shield at a side opposite to the entry side of the magnetic field from the carrier, a magnetoresistive coating arranged on the first and third electrode terminals, a second electrode terminal arranged on the magnetoresistive coating, and opposed to the first electrode terminal, a second magnetic shield arranged on the second electrode terminal, a sense current source connected to the first and second electrode terminals, the sense current source applying sense current in a direction perpendicular to a coating surface of the magnetoresistive coating, and a bias current source that is connected to and applies bias current to the third electrode terminal and one of the first and second electrode terminals.

In an alternative configuration, rather than having the first electrode terminal serve as the first magnetic shield, the second electrode terminal may serve as the second magnetic shield. In a still alternative configuration, the first electrode terminal may serve as the first magnetic shield, while the second electrode terminal may serve as the second magnetic shield.

The present invention controls the magnetization of the MR coating using the current magnetic field that results from the current that flows between the third electrode terminal and one of the first and second electrode terminals, restrains generations of the Barkhousen noises, and provides high reproduction output signals. In addition, the present invention provides fine adjustments to the bias current strength for each head, and thus stably outputs high-quality reproduction signals after the MR head is produced.

The inventive structure does not require the magnetization control coatings to be provided at both sides of the MR coating in the track width direction, thus remarkably facilitating the manufacture process and dramatically improving the yield.

BRIEF DESCRIPTION OF THE DRAWINGS

FIGS. 11A-11C and 11A'-11C' show a manufacture process flow according to a third embodiment of the present invention.

FIGS. 12A-12C and 12A'-12C' show a manufacture process flow according to a third embodiment of the present invention.

DETAILED DESCRIPTION OF THE PREFERRED EMBODIMENTS

Figure 1:
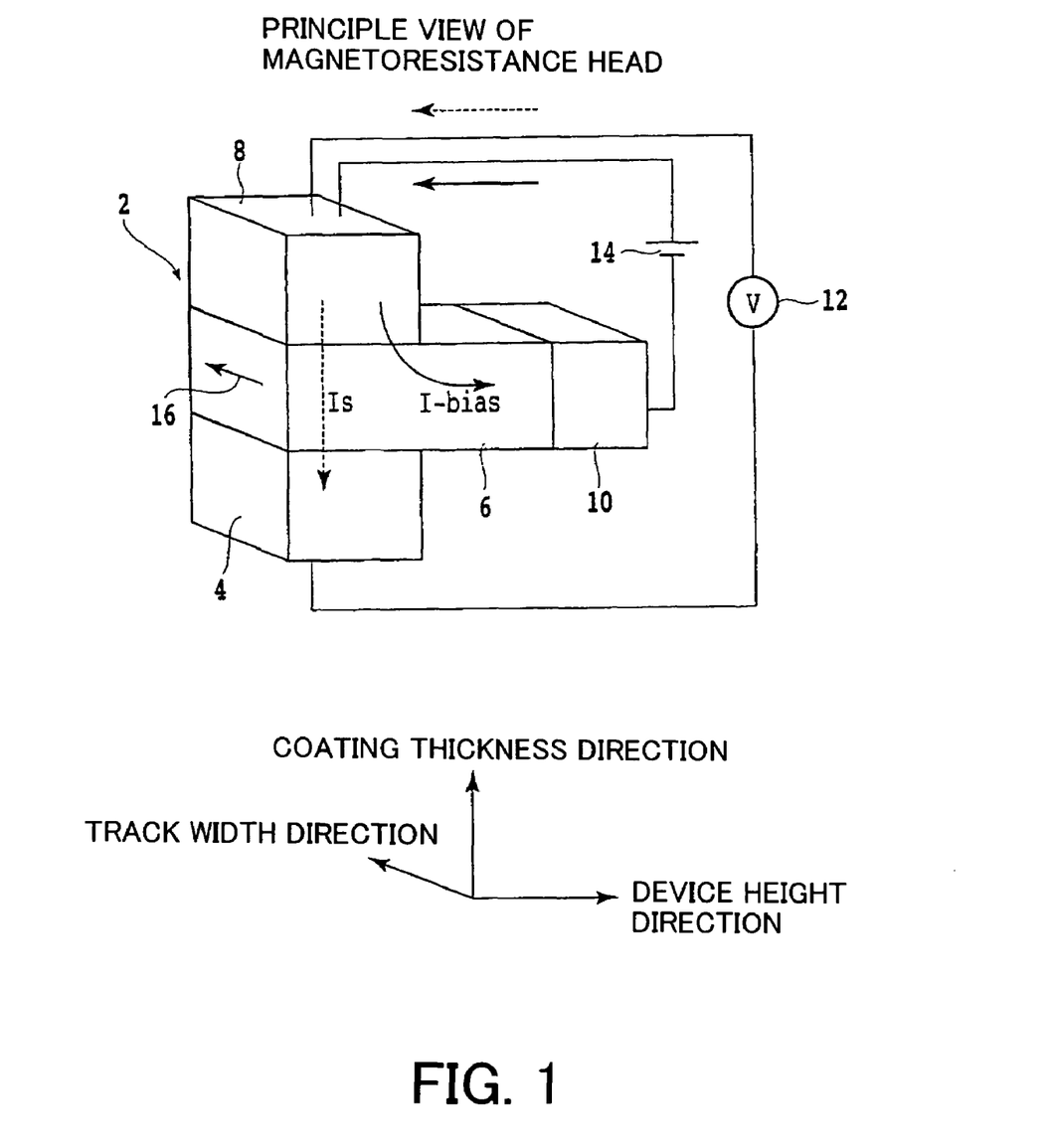
FIG. 1 is a principle diagram of an inventive MR head.

FIG. 1 shows a principle diagram of an inventive MR head. The MR head 2 includes a first electrode terminal 4, a MR coating 6 located on the first electrode terminal 4, and a second electrode terminal 8 located on the MR coating 6. The MR head 2 further includes a third electrode terminal 10 provided on the MR coating 6 at a side opposite to an entry side of the magnetic field from a carrier.

The first and second electrode terminals 4 and 8 are connected to a sense current source 12, and the sense current source 12 applies the sense current Is of a certain current value as shown by a broken-line arrow in an in-plane perpendicular direction of the MR coating 6.

The second and third electrode terminals 8 and 10 are connected to a bias current source 14, and the bias current I-bias flows between the second and third electrode terminals 8 and 10 as shown by a solid-line arrow. The sense current Is and the bias current I-bias flow in almost the same direction along the in-plane perpendicular direction of the second electrode terminal 8.

Applications of the sense current Is and the bias current I-bias in almost the same direction along the in-plane perpendicular direction of the second electrode terminal 8 form the bias magnetic field (or current magnetic field) as shown by an arrow 16 in the MR coating 6, and enables the magnetization of the MR coating 6 to be controlled.

Figure 2:
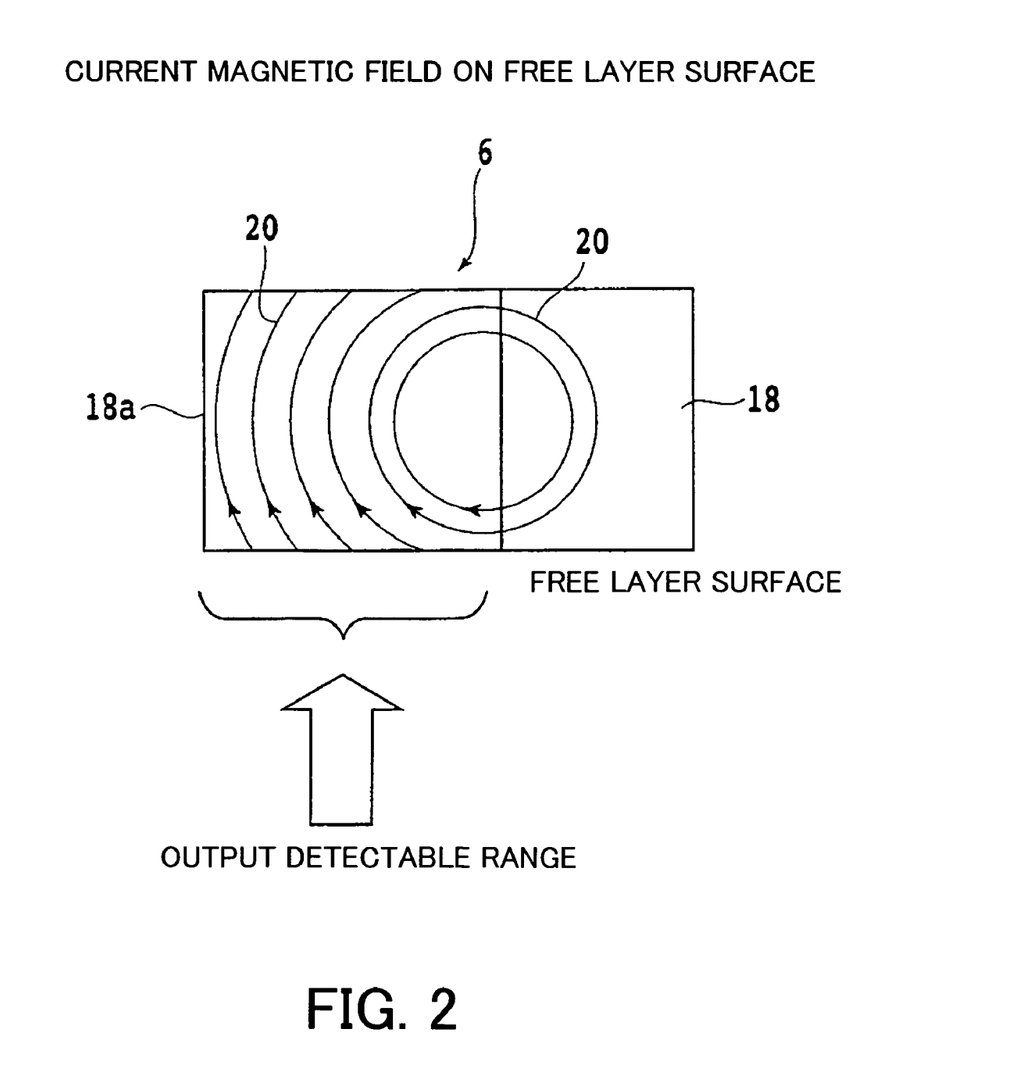
FIG. 2 is a view showing a current magnetic field on a surface of a free layer.

FIG. 2 shows the current magnetic field on the free layer 18 surface of the MR coating 6. Since the bias current I-bias flows between the second and third electrode terminals 8 and 10 while the sense current Is flows between the first and second electrode terminals 4 and 8, a center of the current magnetic field 20 along the revolution direction can be moved to a side opposite to the entry surface (i.e., ABS surface) 18a of the carrier's magnetic field, of the MR coating 6 in the device height direction. The current magnetic field 20 directs in the approximately constant direction on the side of the ABS surface 18a of the MR coating 6. In other words, the current magnetic field directs in the arrow 16 direction in FIG. 1.

The first and second electrode terminals 4 and 8 are made shorter in the device height direction than the MR coating 6 in the device height direction, and located on the MR coating 6 at the side of the ABS surface. As a result, signals only from a most sensitive region can be detected from the MR coating 6. In addition, detections of signals only from a region to which the current magnetic field is applied in almost the same direction lead to reduced generations of Barkhausen noises, and good and high reproduction signal outputs.

As apparent from FIG. 1, the third electrode terminal 10 is electrically isolated from the first and second electrode terminals 4 and 8, and electrically connected to the MR coating 6.

The principle diagram shown in FIG. 1 omits the first magnetic shield located under the first electrode terminal 4, and the second magnetic shield located on the second electrode terminal 8. The present invention allows one or both of the first and second electrode terminals 4 and 8 to serve as the magnetic shield.

While the illustrated principle diagram applies the bias current between the second and third electrode terminals 8 and 10, the bias current may flow between the first and third electrode terminals 4 and 10. In this case, the sense current Is and the bias current I-bias flow in almost the same direction along the in-plane perpendicular direction of the first electrode terminal 4.

The MR coating 6 includes at least one low-resistance coating, and at least two ferromagnetic coatings that sandwich the low-resistance coating. Alternatively, the MR coating 6 includes a ferromagnetic tunnel junction structure or a multilayer coating structure that includes a ferromagnetic layer and a non-magnetic layer.

In other words, the MR coating 6 can use a spin-valve GMR coating, such as NiFe/Cu/NiFe/IrMn, a layered ferrispin-valve GMR coating, such as NiFe/Cu/CoFeB/Ru/CoFeB/PdPtMn, and a tunnel junction type MR coating ("TMR coating"), such as NiFe/Al$_2$O$_3$/NiFe/PdPtMn.

Figure 3:
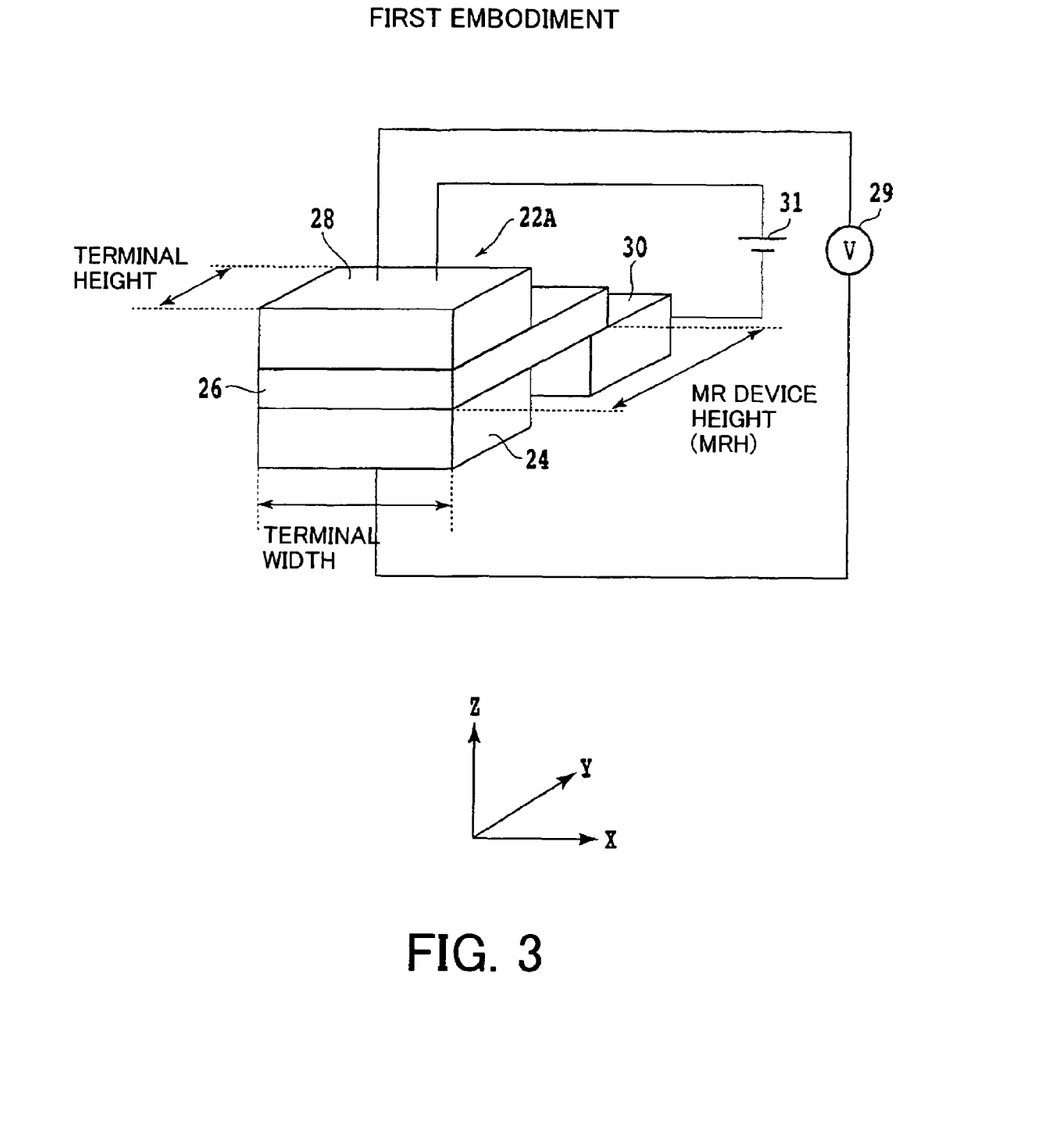
FIG. 3 is a perspective view of a MR head according to a first embodiment of the present invention.

FIG. 3 shows a schematic perspective view of a MR head 22A according to a first embodiment of the present invention, and omits first and second magnetic shields. 24 denotes a first electrode terminal that is made, for example, of Cu or a combination of Cu and Au, and a third electrode terminal 30 is provided apart from the first electrode terminal 24 at a side opposite to the entry surface (i.e., ABS surface) of the carrier's magnetic field, of the first electrode terminal 24. The third electrode terminal 30 is also made, for example, of Cu or a combination of Cu and Au.

A MR coating 26 is located on the first and third electrode terminals 24 and 30, and a second electrode terminal 28 is located on the MR coating 26 opposite to the first electrode terminal 24. The second electrode terminal 28 is also made, for example, of Cu or a combination of Cu and Au.

The first and second electrode terminals 24 and 28 are connected to a sense current source 29, and the sense current source 29 applies the sense current along an in-plane perpendicular direction of the MR coating 26. The second and third electrode terminals 28 and 30 are connected to a bias current source 31, and the bias current flows between the second and third electrode terminals 28 and 30. The sense current Is and the bias current I-bias flow in almost the same direction along the in-plane perpendicular direction of the second electrode terminal 28.

Figure 5A:
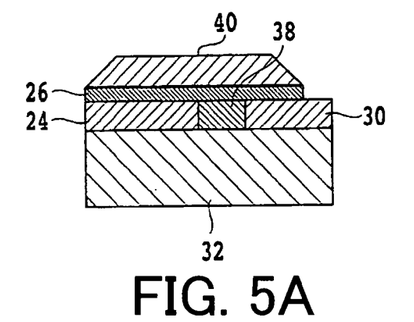
FIGS. 5A-5C and 5A'-5C' show a manufacture process flow according to a first embodiment of the present invention.
Figure 5B:
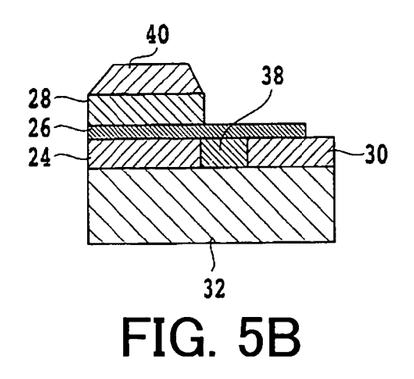
Figure 5C:
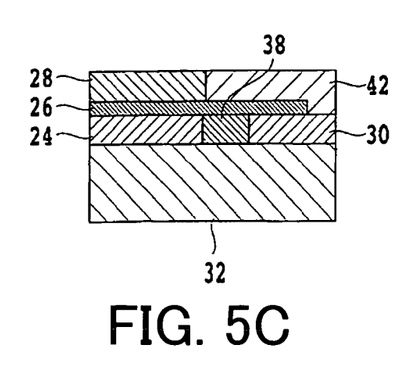
Figure 6A:
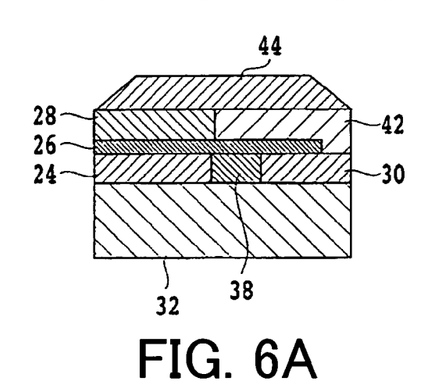
FIGS. 6A-6C and 6A'-6C' show a manufacture process flow according to a first embodiment of the present invention.

A description will be given of a manufacture process of the MR head according to the first embodiment with reference to FIG. 4A to FIG. 6C and FIG. 4A' to FIG. 6C'. FIG. 4A to FIG. 6C are sectional views of the MR head in the height direction, and FIG. 4A' to FIG. 6C' are sectional views in its track width direction.

Figure 4A:
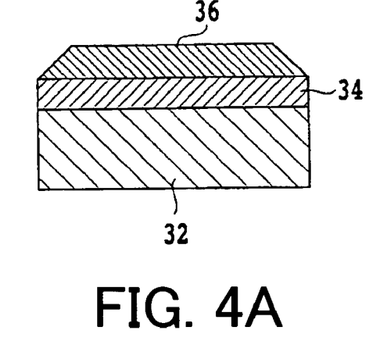
FIGS. 4A-4C and 4A' and 4C' show a manufacture process flow according to a first embodiment of the present invention.

As shown in FIGS. 4A and 4A', a first magnetic shield 32 that includes a soft magnetic coating 32, such as NiFe, and a first electrode terminal layer 34 that includes a non-magnetic metal coating, such as Cu, are sequentially formed on a substrate (not shown).

Alternatively, instead of forming the first electrode terminal layer 34, the first magnetic shield 32 may serve as the first electrode terminal. When the first magnetic shield 32 serves as the first electrode terminal, the first magnetic shield 32 is made of a soft magnetic metal coating.

Figure 4B:
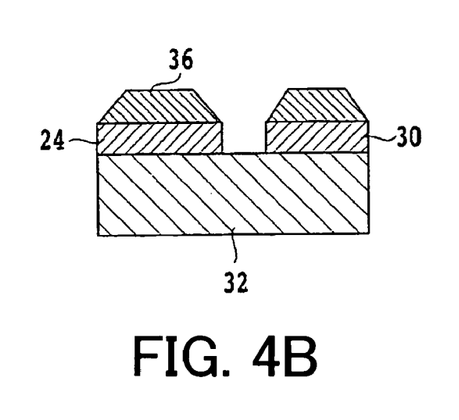

Next, a photoresist 36 is uniformly applied onto the first electrode terminal layer 34, and the photoresist 36 is patterned. Then, the first electrode terminal layer 34 is etched into the first electrode terminal 24 of a desired shape of the first electrode terminal 24 by the ion milling etc. (FIGS. 4B and 4B').

Figure 4C:
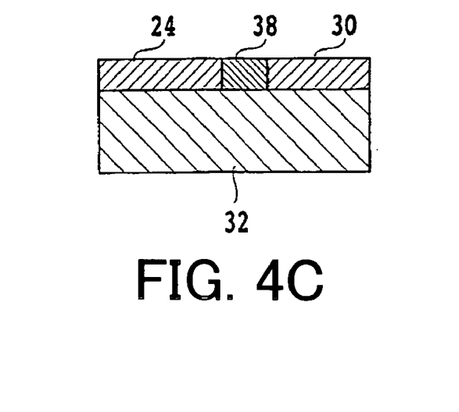

An insulating coating 38, such as Al$_2$O$_3$, is formed without removing the photoresist 36, and then the photoresist 36 is removed (FIGS. 4C and 4C'). Next, the MR coating 26 is formed, and the photoresist 40 is uniformly applied onto it and then patterned. Then, the MR coating 26 is etched into a desired shape by the ion milling etc. (FIGS. 5A and 5A').

Next, the second electrode terminal 28 is formed and a photoresist 40 is uniformly applied and patterned. Then, the second electrode terminal 28 is etched into a desired shape by the ion milling etc. (FIGS. 5B and 5B'). Next, an insulating coating 42, such as Al$_2$O$_3$, is formed without removing the photoresist 40, and then the photoresist 40 is removed (FIGS. 5C and 5C').

Next, a photoresist 44 is uniformly applied and patterned, and then the first, second and third electrode terminals 24, 28 and 30, the MR coating 26 and the insulating coatings 38 and 42 are etched into desired shapes by the ion milling etc. (FIGS. 6A and 6A').

Figure 6B:
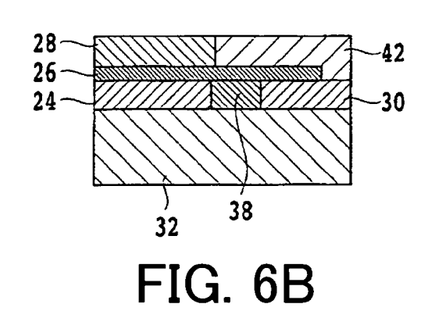
Figure 6C:
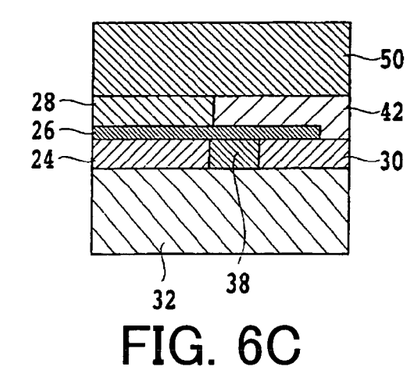

Next, insulating coatings 46 and 48, such as $Al_2O_3$, are formed without removing the photoresist 44, and then the photoresist 44 is removed (FIGS. 6B and 6B'). Finally, a second magnetic shield 50 is formed which includes a soft magnetic coating, such as NiFe, as shown in FIGS. 6C and 6C'. Alternatively, instead of forming the second magnetic shield 50, the second electrode terminal 28 may serve as the second magnetic shield.

The above described manufacture process uses a plating method and a vacuum evaporation method to form the first and second magnetic shields 32 and 50, and a sputtering method etc. to form the electrode terminals 24, 28 and 30, the MR coating 26, and the insulating coatings 38, 46, and 48. The electrode terminals 24, 26 and 30 are made of a non-magnetic metal coating, such as Cu, or a soft magnetic metal coating, such as NiFe.

Figure 7:
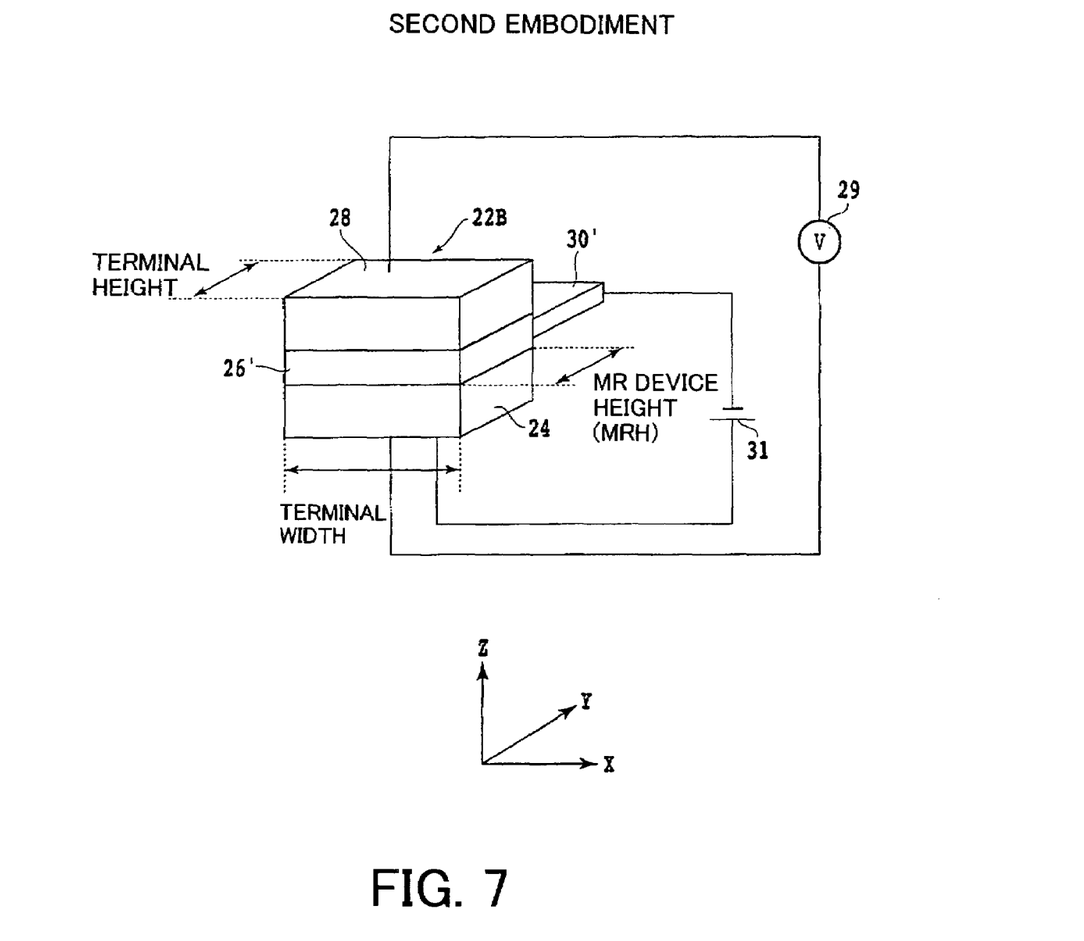
FIG. 7 is a perspective view of a MR head according to a second embodiment of the present invention.

FIG. 7 shows a schematic perspective view of a MR head 22B according to a second embodiment of the present invention, and omits first and second magnetic shields. In the MR head 22B of the instant embodiment, the first electrode terminal 24, the MR coating 26', and the second magnetic shield 28 have substantially the same length in the device height direction.

A third electrode terminal 30' is provided at a side opposite to the entry surface (i.e., ABS surface) of the carrier's magnetic field, of the MR coating 26', and is electrically connected to the MR coating 26'. The third electrode terminal 30' is isolated from the first and second electrode terminals 24 and 28.

The first and second electrode terminals 24 and 28 are connected to the sense current source 29, and the first and third electrode terminals 24 and 30 are connected to the bias current source 31. The sense current and the bias current flow in almost the same direction along the in-plane perpendicular direction of the first electrode terminal 24.

A description will be given of a manufacture process of the MR head 22B according to the second embodiment with reference to FIG. 8A to FIG. 9C and FIG. 8A' to FIG. 9C'. FIG. 8A to FIG. 9C are sectional views of the MR head 22B in the height direction, and FIG. 8A' to FIG. 9C' are sectional views in its track width direction.

Figure 8A:
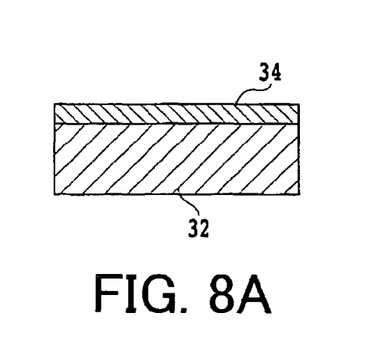
FIGS. 8A-8C and 8A'-8C' show a manufacture process flow according to a second embodiment of the present invention.

First, as shown in FIGS. 8A and 8A', the first magnetic shield 32, and the first electrode terminal layer 34 are sequentially formed on a substrate (not shown). Alternatively, instead of forming the first electrode terminal layer 34, the first magnetic shield 32 may serve as the first electrode terminal.

Figure 8B:
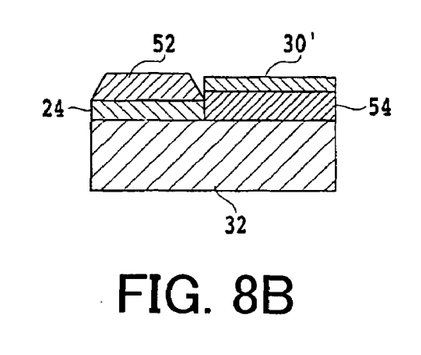

Next, a photoresist 52 is uniformly applied and patterned, and then the first electrode terminal layer 34 is etched into a desired shape of the first electrode terminal 24 by the ion milling etc. Next, an insulating coating 54 and the third electrode terminal 30', such as $Al_2O_3$, are formed without removing the photoresist 52 (FIG. 8B and 8B'). A top surface of the insulating coating 54 is preferably located above a top surface of the first electrode terminal 24, so as to prevent electric conduction between the first electrode terminal 24 and the third electrode terminal 30'.

Figure 8C:
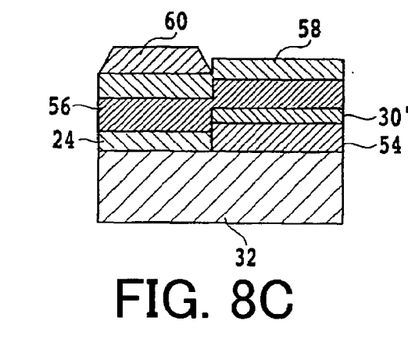

After the photoresist 52 is removed, the MR coating layer 56 and the second electrode terminal layer 58 are sequentially formed as shown in FIGS. 8C and 8C', and a photoresist 60 is uniformly applied and patterned.

Figure 9A:
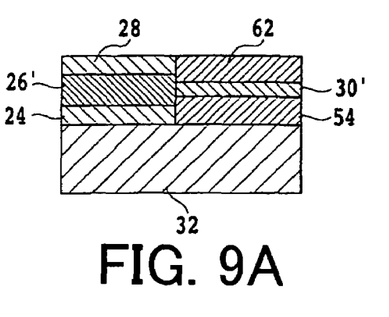
FIGS. 9A-9C and 9A'-9C' show a manufacture process flow according to a second embodiment of the present invention.

Then, a second electrode terminal layer 58 and the MR coating layer 56 are etched into desired shapes of second electrode terminal 28 and the MR coating 26' by using the photoresist 60 as a mask and the ion milling etc. After the insulating coating 62 is formed, the photoresist 60 is removed (FIGS. 9A and 9A').

Here, the top surface of the MR coating 26' is preferably located above the top surface of the third electrode terminal 30' so as to prevent electric conduction between the second electrode terminal 28 and the third electrode terminal 30'. Alternatively, the third electrode terminal 30' is made thicker than a predetermined coating thickness, and subsequent etching returns the thickness to the predetermined coating thickness.

Figure 9B:
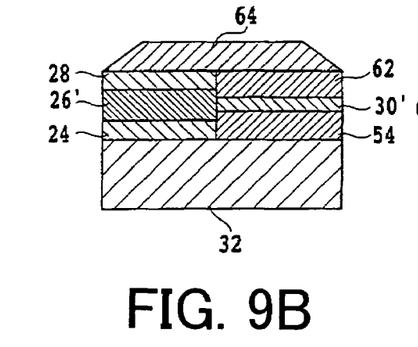
Figure 9C:
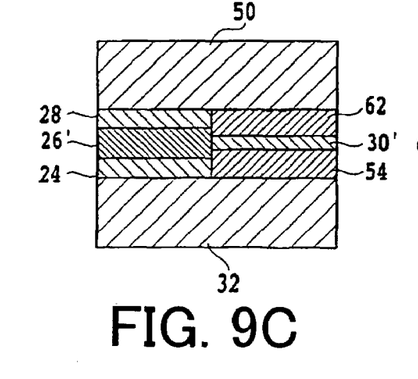

Next, a photoresist 64 is uniformly applied and patterned, and then the electrode terminals 24, 28 and 30', the MR coating 26' and the insulating coatings 54, 62, 66 and 68 are etched into desired shapes by the ion milling etc. (FIGS. 9B and 9B'). Finally, the second magnetic shield 50 is formed as shown in FIGS. 9C and 9C'. Alternatively, instead of forming the second magnetic shield 50, the second electrode terminal 28 may serve as the second magnetic shield.

The above described manufacture process uses a plating method and a vacuum evaporation method to form the first and second magnetic shields 32 and 50, and a sputtering method etc. to form the electrode terminals 24, 28 and 30', the MR coating 26', the insulating coatings 54, 62, 66 and 68. The electrode terminals 24, 26 and 30' are made of a non-magnetic metal coating, such as Cu, or a soft magnetic metal coating, such as NiFe.

Figure 10:
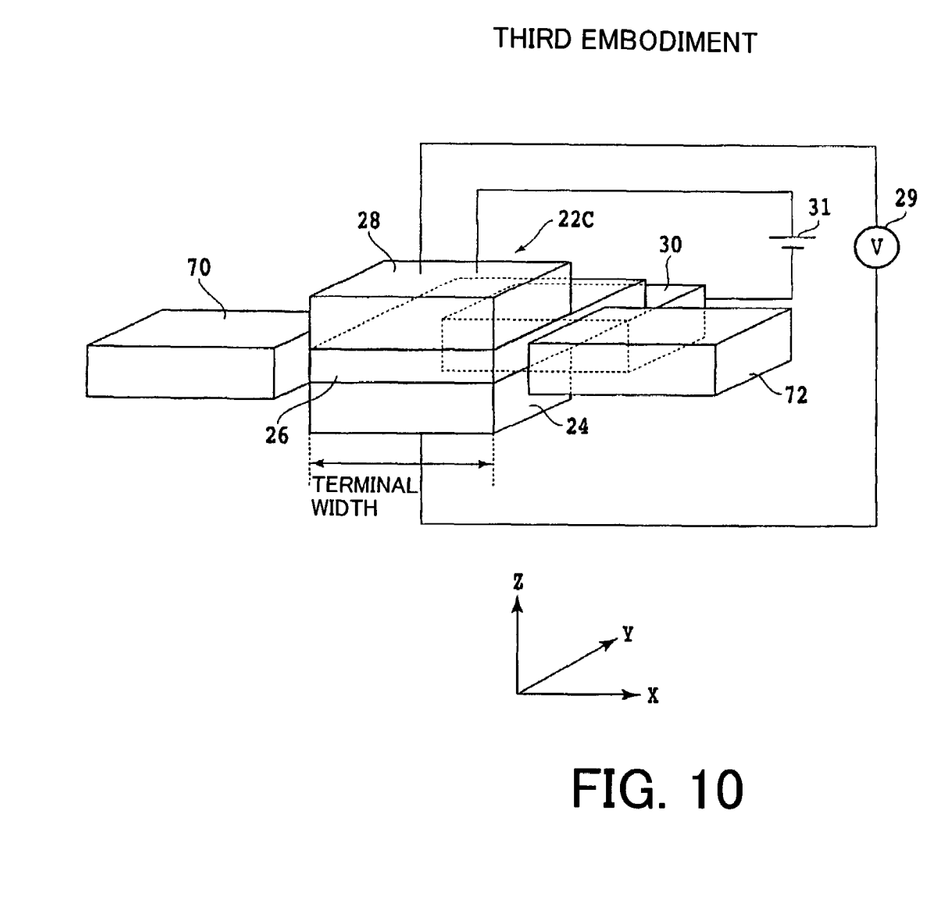
FIG. 10 is a perspective view of a MR head according to a third embodiment of the present invention.

FIG. 10 shows a schematic perspective view of a MR head 22C according to a third embodiment of the present invention and omits first and second magnetic shields. The MR head 22C of the instant embodiment provides side magnetic shields 70 and 72 at both sides of the MR head 22A of the first embodiment in the track width direction.

A description will be given of a manufacture process of the MR head 22C with reference to FIG. 11A to FIG. 12B and FIG. 11A' to FIG. 12B'. FIG. 11A to FIG. 12B are sectional views of the MR head 22C in the height direction, and FIG. 11A' to FIG. 12B' are sectional views in its track width direction.

Figure 11A:
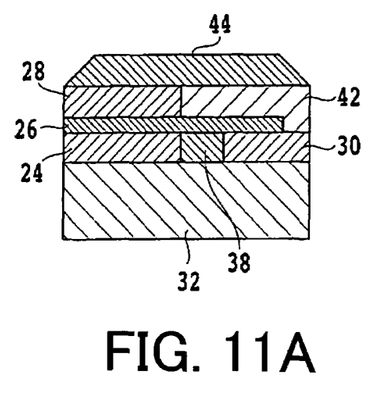

The manufacture process up to FIGS. 11A and 11A' is the same as that up to FIGS. 6A and 6A' in the MR head 22A of the first embodiment, and a description thereof will be omitted.

Figure 11B:
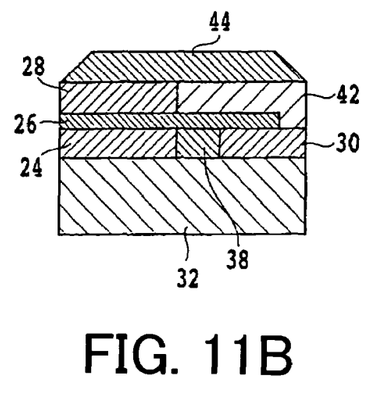
Figure 12A:
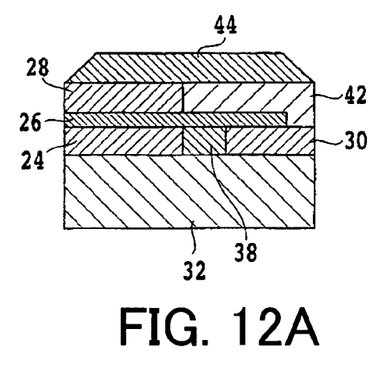
Figure 12B:
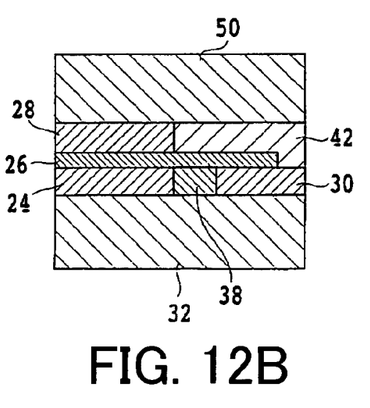

As shown in FIGS. 11B and 11B', the insulating coatings 74 and 76 are formed without removing the photoresist 44. Next, the side magnetic shields 70 and 72, and insulating coatings 78 and 80 are sequentially formed without removing the photoresist 44 (FIGS. 12A and 12A').

The insulating coatings 78 and 80 may be omitted. Finally, as shown in FIGS. 12B and 12B', the second magnetic shield 50 is formed after the photoresist 44 is removed.

The side magnetic shields 70 and 72 can be electrically connected to one of the electrode terminals 24, 28 and 30, but the electrode terminals 24, 28 and 30 should be electrically isolated from one another.

The side magnetic shields 70 and 72 can be electrically connected to one of the first and second magnetic shields 32 and 50, but the first and second magnetic shields 32 and 50 should be electrically isolated from each other.

The above described manufacture process uses a plating method and a vacuum evaporation method to form the first and second magnetic shields 32 and 50, and side magnetic shields 70 and 72, and a sputtering method etc. to form the electrode terminals 24, 28 and 30, the MR coating 26, the insulating coatings 38, 42, 74, and 76. The electrode terminals 24, 26 and 30 are made of a non-magnetic metal coating, such as Cu, or a soft magnetic metal coating, such as NiFe.

What is claimed is:

1. A magnetoresistive head comprising:
   a first magnetic shield;
   a first electrode terminal arranged on said first magnetic shield at an entry side of a magnetic field from a carrier;
   a third electrode terminal that is spaced from said first electrode terminal, and arranged on said first magnetic shield at a side opposite to the entry side of the magnetic field from the carrier;
   a magnetoresistive coating arranged on said first and third electrode terminals;
   a second electrode terminal that is arranged on the magnetoresistive coating, and opposed to said first electrode terminal;
   a second magnetic shield arranged on said second electrode terminal;
   a sense current source connected to said first and second electrode terminals, said sense current source applying sense current in a direction perpendicular to a coating surface of said magnetoresistive coating; and
   a bias current source that is connected to and applies bias current to said third electrode terminal and one of said first and second electrode terminals.

2. A magnetoresistive head according to claim 1, wherein the sense current and the bias current flow in almost the same direction along an in-plane perpendicular direction of said one of the first and second electrode terminals.

3. A magnetoresistive head according to claim 1, wherein said third electrode terminal is electrically isolated from said first and second electrode terminals.

4. A magnetoresistive head according to claim 1, wherein said third electrode terminal is electrically connected to said magnetoresistive coating.

5. A magnetoresistive head according to claim 1, wherein said magnetoresistive coating is longer in a device height direction than the first and second electrode terminals.

6. A magnetoresistive head according to claim 1, wherein said magnetoresistive coating includes at least one low-resistance coating, and at least two ferromagnetic coatings that hold the low-resistance coating, an electric resistance of said magnetoresistive coating varying according to a magnetic field.

7. A magnetoresistive head according to claim 1, wherein said magnetoresistive coating includes a ferromagnetic tunnel junction structure, and an electric resistance of said magnetoresistive coating varies according to a magnetic field.

8. A magnetoresistive head according to claim 1, wherein said magnetoresistive coating has a multilayer coating structure that includes a ferromagnetic layer and a non-magnetic layer, and an electric resistance of said magnetoresistive coating varies according to a magnetic field.

9. A magnetoresistive head according to claim 1, further comprising a pair of side magnetic shields arranged at both sides of said magnetoresistive coating.

10. A magnetoresistive head comprising:
    a first magnetic shield;
    a first electrode terminal arranged on said first magnetic shield at an entry side of a magnetic field from a carrier;
    a third electrode terminal that is spaced from said first electrode terminal, and arranged on said first magnetic shield at a side opposite to the entry side of the magnetic field from the carrier;
    a magnetoresistive coating arranged on said first electrode terminal;
    a second electrode terminal that is arranged on the magnetoresistive coating, and opposed to said first electrode terminal;
    a second magnetic shield arranged on said second electrode terminal;
    a sense current source connected to said first and second electrode terminals, said sense current source applying sense current in a direction perpendicular to a coating surface of said magnetoresistive coating; and
    a bias current source that is connected to and applies bias current to said third electrode terminal and one of said first and second electrode terminals.

11. A magnetoresistive head according to claim 10, wherein the sense current and the bias current flow in almost the same direction along an in-plane perpendicular direction of said one of the first and second electrode terminals.

12. A magnetoresistive head according to claim 10, wherein said third electrode terminal is electrically isolated from said first and second electrode terminals.

13. A magnetoresistive head according to claim 10, wherein said third electrode terminal is electrically connected to said magnetoresistive coating.

14. A magnetoresistive head according to claim 10, wherein said magnetoresistive coating is as long in a device height direction as the first and second electrode terminals.

15. A magnetoresistive head according to claim 10, further comprising a pair of side magnetic shields arranged at both sides of said magnetoresistive coating.

16. A magnetoresistive head comprising:
    a first electrode terminal that is arranged on a first magnetic shield at an entry side of a magnetic field from a carrier, and serves as said first magnetic shield;
    a third electrode terminal that is spaced from said first electrode terminal, and arranged on said first magnetic shield at a side opposite to the entry side of the magnetic field from the carrier;
    a magnetoresistive coating arranged on said first and third electrode terminals;
    a second electrode terminal arranged on the magnetoresistive coating, and opposed to said first electrode terminal;
    a second magnetic field arranged on said second electrode terminal;
    a sense current source connected to said first and second electrode terminals, said sense current source applying sense current in a direction perpendicular to a coating surface of said magnetoresistive coating; and
    a bias current source that is connected to and applies bias current to said third electrode terminal and one of said first and second electrode terminals.

17. A magnetoresistive head comprising:
    a first magnetic shield;
    a first electrode terminal arranged on said first magnetic shield at an entry side of a magnetic field from a carrier;
    a third electrode terminal that is spaced from said first electrode terminal, and arranged on said first magnetic shield at a side opposite to the entry side of the magnetic field from the carrier;
    a magnetoresistive coating arranged on said first and third electrode terminals;
    a second electrode terminal that is arranged on the magnetoresistive coating, and opposed to said first electrode terminal, said second electrode terminal serving as a second magnetic shield;

a sense current source connected to said first and second electrode terminals, said sense current source applying sense current in a direction perpendicular to a coating surface of said magnetoresistive coating; and a bias current source that is connected to and applies bias current to said third electrode terminal and one of said first and second electrode terminals.

18. A magnetoresistive head comprising:

a first electrode terminal that is arranged on a first magnetic shield at an entry side of a magnetic field from a carrier, and serves as said first magnetic shield;

a third electrode terminal that is spaced from said first electrode terminal, and arranged on said first magnetic shield at a side opposite to the entry side of the magnetic field from the carrier;

a magnetoresistive coating arranged on said first and third electrode terminals;

a second electrode terminal arranged on the magnetoresistive coating, and opposed to said first electrode terminal, said second electrode serving as a second magnetic shield;

a sense current source connected to said first and second electrode terminals, said sense current source applying sense current in a direction perpendicular to a coating surface of said magnetoresistive coating; and a bias current source that is connected to and applies bias current to said third electrode terminal and one of said first and second electrode terminals.

* * * * *